UNITED STATES PATENT OFFICE.

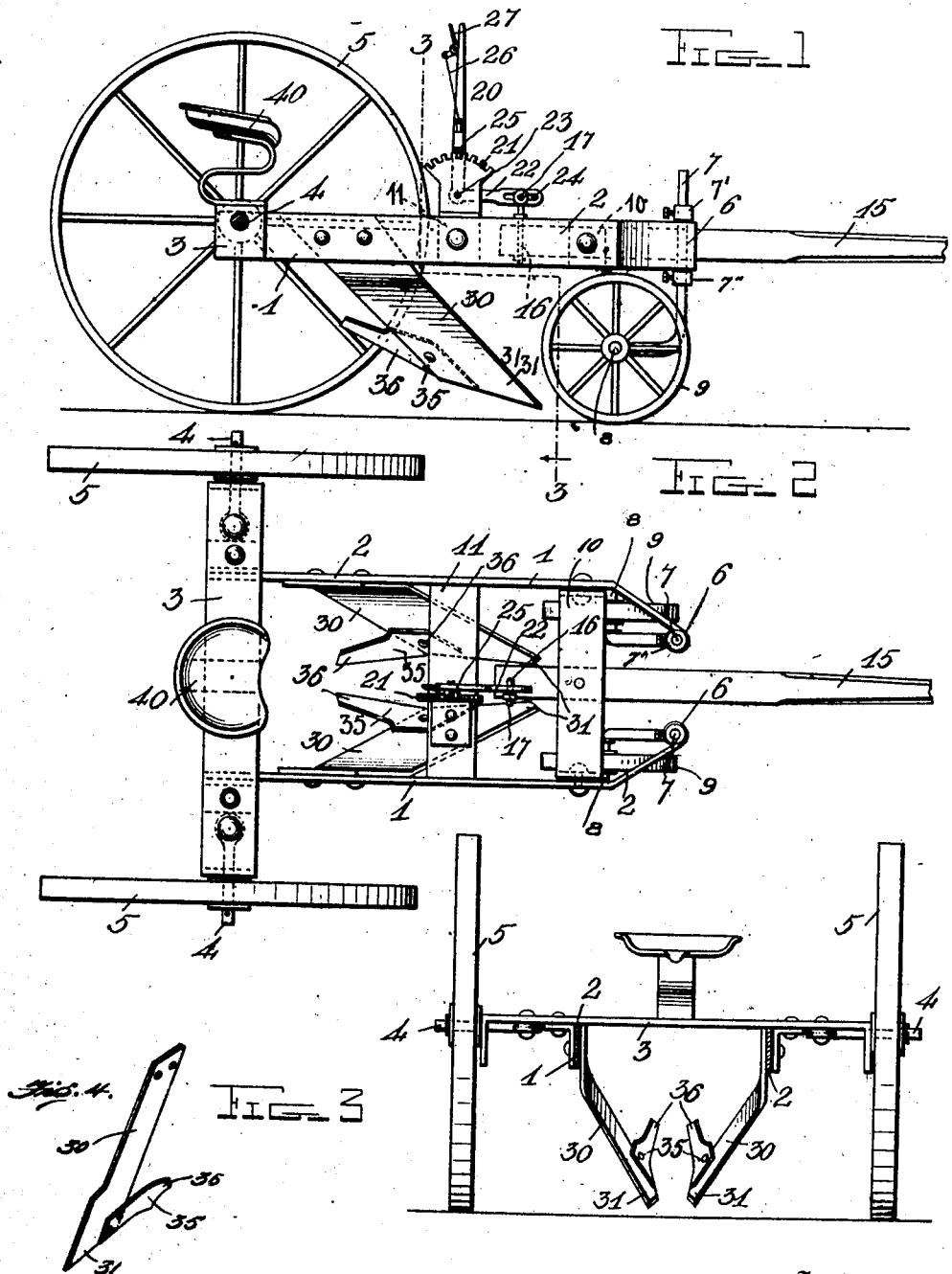

EDWARD A. SMITH, OF LOVELAND, COLORADO.

BEET-PULLER.

No. 885,538.  Specification of Letters Patent.  Patented April 21, 1908.

Application filed February 11, 1907. Serial No. 356,918.

*To all whom it may concern:*

Be it known that I, EDWARD A. SMITH, a citizen of the United States, residing at Loveland, in the county of Larimer and State of Colorado, have invented certain new and useful Improvements in Beet-Pullers; and I do declare the following to be a full, clear, and exact description of the invention, such as will enable others skilled in the art to which it appertains to make and use the same.

This invention relates to a machine for pulling beets and similar vegetables.

The object of the invention is to provide a simple, durable and efficient beet puller which when drawn over the field will first pull the beets out of the ground and then discharge them out of the path of the wheels of the machine.

In the accompanying drawings, Figure 1 represents a side elevation of this improved beet puller; Fig. 2 represents a top plan view thereof; and Fig. 3 represents a vertical section taken on line 3—3 of Fig. 1. Fig. 4 represents a perspective view of one of the colters and puller bars detached and in position ready for assembling.

Referring to the embodiment illustrated, 1 denotes the main frame, which comprises two side beams or bars, as 2, having their parallel rear ends connected by a seat-carrying bar 3, having stub shafts, as 4, at its opposite ends on which the wheels, as 5, turn. The front ends of the bars, as 2, are bent inwardly and provided with eyes, as 6, in which are disposed the stems 7 of the stub shafts, as 8, on which the stub wheels, as 9, are mounted. These bars 2 are adapted to be raised and lowered on the stems 7 of the wheels 9 to regulate the depth the colters hereinafter described, will pass into the ground, by means of adjustable collars 7' and 7" disposed above and below the side bars on said stems. The side bars, as 2, are also connected and strengthened by a front cross bar 10 to which a tongue 15 is bolted, and an intermediate cross bar 11 on which is the mechanism 20 for raising and lowering the tongue. This mechanism comprises a toothed rack 21 secured to the cross bar 11 and a bell crank lever 22 pivoted to the rack at 23 and having the free end of its short arm slotted longitudinally at 24. In this slot 24 is journaled a lateral arm 17 of an L-shaped bolt 16 secured to the inner end of the tongue 15. Mounted on the long arm of the bell crank lever 22 is a spring actuated pawl 25 having a releasing rod 26 connected to its upper end. The other end of this rod 26 is connected to a similar bell crank lever 27, the long arm of which is operated to withdraw the pawl from the rack to permit it to be placed between different teeth for locking the tongue in raised or lowered position.

Bolted to the side bars, as 2, are two colters, as 30, preferably made of steel and sharpened on their front edges for about six inches from their lower points, as 31. Secured to the rear edges of these colters, as 30, preferably on the inside thereof, are two flat puller bars, as 35. These puller bars are bolted at their lower front ends to the rear edge of the colters with their upwardly inclined rear ends, as 36, converging toward each other with spaces between them and which ends pass under the tops of the foliage of the beets and pull them from the ground, the ground around the beets having first been loosened by the passage of the colters entering in front of the puller bars. These colters being sharp and straight enter the ground with very little resistance and consequently the machine may be drawn by two small horses. The colters enter the ground for a depth of about three and one-half inches and their lower ends are spaced about six and one-half inches apart. A spring-seat 40 is preferably mounted on the rear cross bar 3.

I claim as my invention,—

1. In a beet puller, the combination of a supporting frame mounted on wheels, standing colters secured to said frame, and flat puller bars attached at their front ends to the rear of said colters and having their free ends inclined upwardly and converging toward each other.

2. In a beet puller, the combination of a supporting frame mounted on wheels, standing colters secured to said frame, flat vertically disposed puller bars secured at their front ends to the rear of said colters and having their free ends inclined upwardly and bent inwardly to form lifting means for engaging the tops of the beets.

In testimony whereof I have hereunto set my hand in presence of two subscribing witnesses.

EDWARD A. SMITH.

Witnesses.
  AB H. ROMANS,
  GLEN H. VAN HORN.